United States Patent
Lee et al.

(10) Patent No.: US 7,206,453 B2
(45) Date of Patent: Apr. 17, 2007

(54) DYNAMIC FILTERING FOR LOSSY COMPRESSION

(75) Inventors: Ming-Chieh Lee, Bellevue, WA (US); Chih-Lung (Bruce) Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 516 days.

(21) Appl. No.: 09/849,502

(22) Filed: May 3, 2001

(65) Prior Publication Data

US 2002/0186890 A1    Dec. 12, 2002

(51) Int. Cl.
G06K 9/36    (2006.01)
G06K 9/40    (2006.01)

(52) U.S. Cl. .................................. 382/239; 382/261

(58) Field of Classification Search ............... 382/239, 382/232, 236, 250, 251, 261–262, 260, 254
See application file for complete search history.

(56) References Cited

U.S. PATENT DOCUMENTS

| | | | | |
|---|---|---|---|---|
| 4,334,244 A * | 6/1982 | Chan et al. | ................. | 348/606 |
| 4,849,812 A | 7/1989 | Borgers et al. | .......... | 348/400.1 |
| 5,089,889 A * | 2/1992 | Sugiyama | .............. | 375/240.12 |
| 5,467,134 A | 11/1995 | Laney et al. | | |
| 5,509,089 A * | 4/1996 | Ghoshal | ..................... | 382/236 |
| 5,544,286 A | 8/1996 | Laney | ......................... | 395/114 |
| 5,604,856 A | 2/1997 | Guenter | | |
| 5,611,038 A | 3/1997 | Shaw et al. | | |
| 5,625,714 A * | 4/1997 | Fukuda | ....................... | 382/233 |
| 5,787,203 A | 7/1998 | Lee et al. | | |
| 5,799,113 A | 8/1998 | Lee | ............................. | 382/256 |
| 5,835,149 A | 11/1998 | Astle | | |
| 5,835,495 A | 11/1998 | Ferriere | | |
| 5,926,209 A * | 7/1999 | Glatt | ......................... | 348/143 |
| 5,946,419 A | 8/1999 | Chen et al. | ................. | 382/243 |
| 5,969,764 A * | 10/1999 | Sun et al. | ............. | 375/240.06 |
| 6,026,190 A * | 2/2000 | Astle | .......................... | 382/232 |
| 6,115,420 A | 9/2000 | Wang | | |
| 6,115,689 A | 9/2000 | Malvar | | |
| 6,182,034 B1 | 1/2001 | Malvar | | |
| 6,278,735 B1 | 8/2001 | Mohsenian | ................. | 375/240 |
| 6,281,942 B1 | 8/2001 | Wang | ........................ | 348/607 |

(Continued)

OTHER PUBLICATIONS

"The Image Processing Handbook," Russ, John C., 2nd edition, CRC Press, 1994, pp. 164-166.*

(Continued)

Primary Examiner—Wenpeng Chen
(74) Attorney, Agent, or Firm—Klarquist Sparkman, LLP

(57) ABSTRACT

An encoder dynamically filters information for lossy compression so as to control bitrate or quality with few sudden, dramatic changes to perceptual quality of the compressed information. For example, a video encoder regulates the level of a buffer (e.g., how full or empty the buffer is) by adjusting median filtering of video information (e.g., pixel data and/or prediction residuals). The buffer stores compressed video information for the video encoder. Based upon the buffer level, the video encoder changes the median filter kernel applied to video information. If the buffer starts to get too full, the video encoder increases the size of the kernel, which tends to smooth the video information, introduce slight blurriness, and deplete the buffer. If the buffer starts to get too empty, the video encoder decreases the size of the kernel or stops filtering, which tends to preserve the video information and fill the buffer.

31 Claims, 3 Drawing Sheets

U.S. PATENT DOCUMENTS

| | | | |
|---|---|---|---|
| 6,380,985 B1 | 4/2002 | Callahan | 348/607 |
| 6,473,409 B1 | 10/2002 | Malvar | 370/286 |
| 6,556,925 B1 * | 4/2003 | Mori et al. | 702/34 |
| 6,728,317 B1 | 4/2004 | Demos | 375/240.21 |

OTHER PUBLICATIONS

Senel et al., "Topological Median Filters," 44 pp. [Retrieved from http://citeseer.nj.nec.com/277604.html on Apr. 30, 2001.]

Hsia et al., "A Parallel Median Filter with Pipelined Scheduling for Real-Time 1D and 2D Signal Processing," *IEICE Trans. Fundamentals*, vol. E83-A, No. 7, pp. 1396-1404 (Jul. 2000).

Yli-Harja et al., "Run-length Distributions of Recursive Median Filters Using Probabilistic Automata," *Proceeding of Scandinavian Conference on Image Analysis*, Kangerlussuaq, Greenland, Jun. 7-11, 1999, pp. 251-258 (1999).

Kotropoulos et al., "Adaptive LMS L-filters for Noise Suppression in Images," *IEEE Transactions on Image Processing*, vol. 5, No. 12, pp. 1596-1609 (1996). [48 pp. retrieved from http://citeseer.nj.nec.com/kotropoulos96adaptive.html on Apr. 30, 2001.]

Tsekeridou et al., "Morphological Signal Adaptive Median Filter for Still Image and Image Sequence Filtering," *IEEE Int. Symposium on Circuits and Systems (ISCAS'98)*, 4 pp. (1998).

Kim et al., "Spatio-temporal Adaptive 3-D Kalman Filter for Video," *IEEE Trans. on Image Process.*, vol. 6, No. 3, pp. 414-423 (Mar. 1997) (12 pp. printout).

Elad et al., "Super-Resolution Restoration of An Image Sequence—Adaptive Filtering Approach," 24 pp. [retrieved from http://citeseer.nj.nec.com/342620.html on Apr. 30, 2001.]

Braum et al., "Motion-Compensating Real-Time Format Converter for Video on Multimedia Displays," *Proceedings IEEE 4th International Conference on Image Processing (ICIP-97)*, vol. I, pp. 125-128 (1997).

Tramini et al., "Intraframe Image Decoding Based on a Nonlinear Variational Approach," *International Journal of Imaging Systems and Technology*, vol. 9, No. 5, pp. 369-380 (1999) (22 pp. printout).

Bially et al., "A Technique for Adaptive Voice Flow Control in Integrated Packet Networks," *IEEE Transactions on Communications*, vol. COM-28, No. 3, pp. 325-333 (Mar. 1980).

Defee et al., "Nonlinear Filters in Image Pyramid Generation," *IEEE International Conference on Systems Engineering*, p. 269-272 (1991).

Wong, "Nonlinear Scale-Space Filtering and Multiresolution Systems," *IEEE Transactions on Image Processing*, vol. 4, No. 6, pp. 774-787 (Jun. 1995).

Ranka et al., "Efficient Serial and Parallel Algorithm for Median Filtering," *IEEE Transactions on Signal Processing*, vol. 39, Iss. 6, p. 1462-1466 (Jun. 1991).

Haddad et al., "Digital Signal: Theory, Applications, and Hardware," *Computer Science Press*, p. 257-261 (1991).

Roosmalen et al., "Noise Reduction of Image Sequences as Preprocessing for MPEG2 Encoding," *Proceedings of EUSIPCO*, 4 pp. (1998).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Yli-Harja et al., "Efficient Representation and Implementation of Recursive Median Filters and Their Cascade Compositions," *Proceedings of the Finnish Signal Processing Symposium*, Oulu, Finland, pp. 84-88 (May 1999).

Reeves, "On the Selection of Median Structure for Image Filtering," *IEEE Transactions on Circuits and Systems II: Analog and Digital Signal Processing*, vol. 42, pp. 556-558 (Aug. 1995) (12 pp. printout).

ITU-T, "Draft ITU-T Recommendation H.263, Video Coding for Low Bitrate Communication," *Telecommunication Standardization Sector of ITU*, 53 pp. (1995).

Kopp et al., "Efficient 3×3 Median Filter Computations," Institute of Computer Graphics and Algorithms, Vienna University of Technology, Technical Report TR-186-2-94-18, 4 pp. (1994).

International Organization for Standardization, "MPEG-4 Video Verification Model version 18.0," ISO/IEC JTC1/SC29/WG11 N3908, Jan. 2001, Pisa, pp. 1-10, 299-311 (Jan. 2001).

* cited by examiner

Figure 1, Prior Art
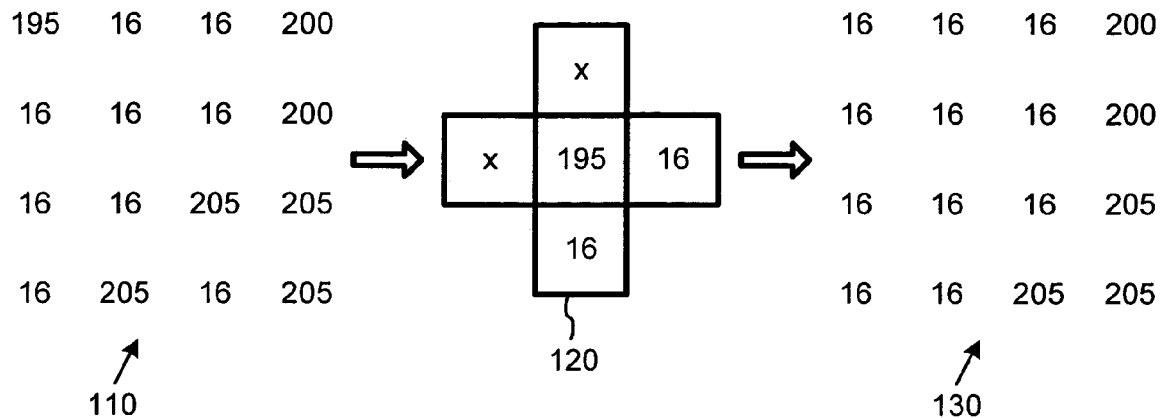
Figure 2
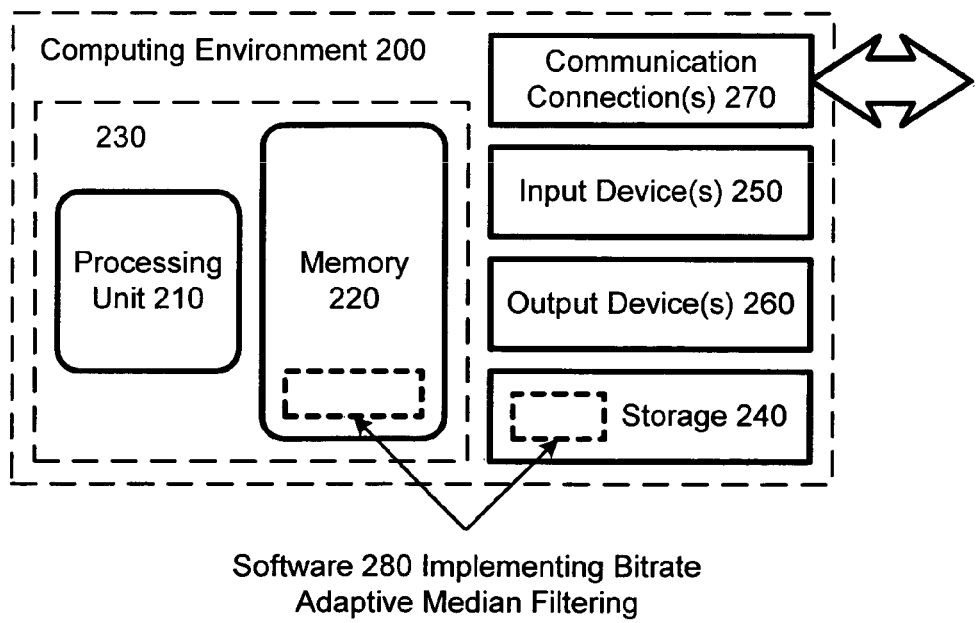
Software 280 Implementing Bitrate Adaptive Median Filtering

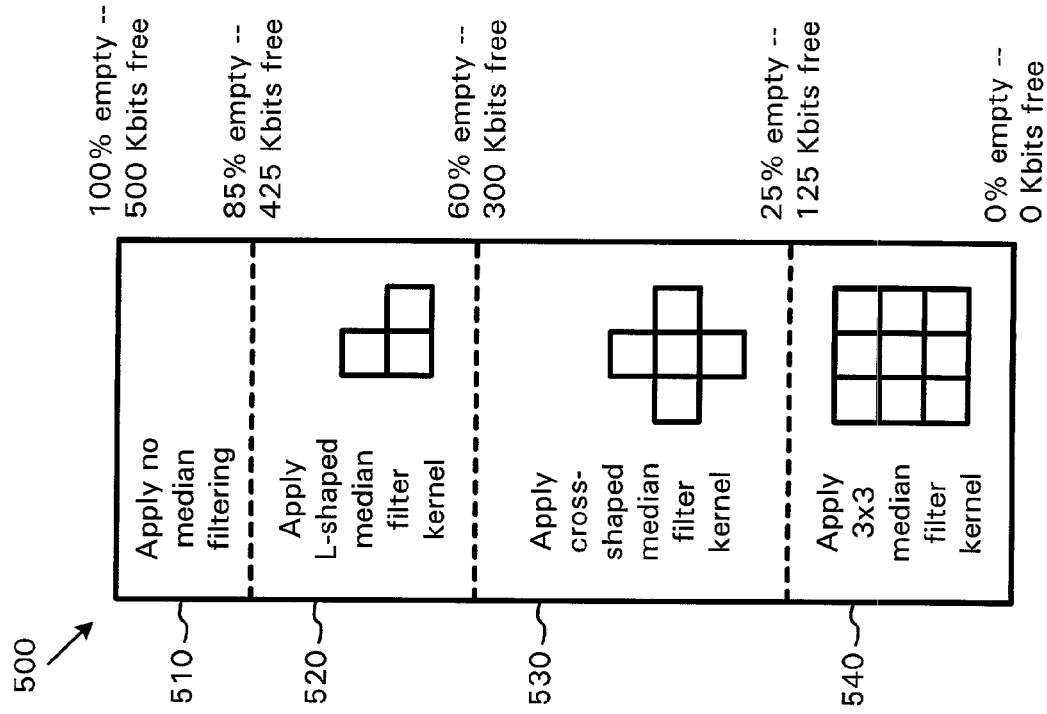
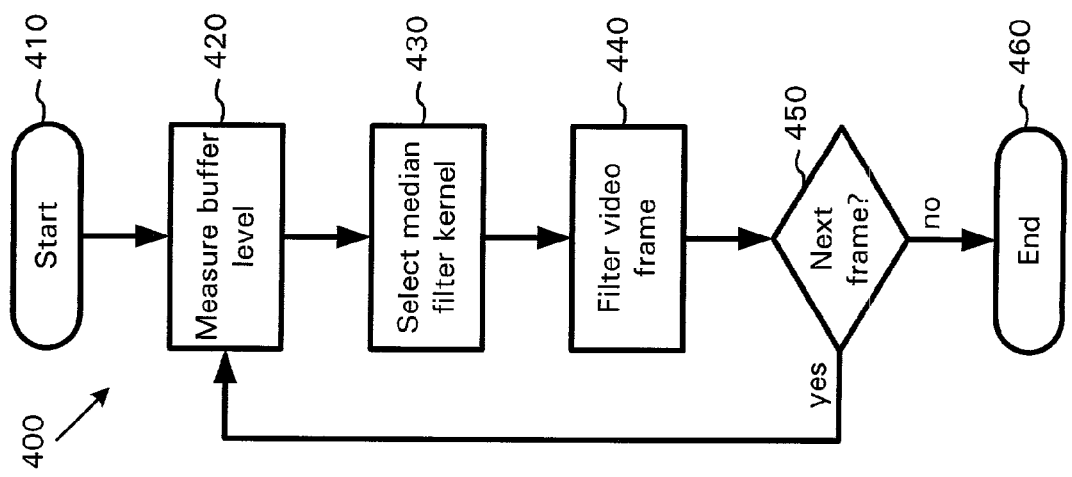

DYNAMIC FILTERING FOR LOSSY COMPRESSION

TECHNICAL FIELD

The present invention relates to dynamic filtering of information for lossy compression. In one embodiment, a video encoder changes how video information is median filtered based upon level of a buffer in the video encoder.

BACKGROUND OF THE INVENTION

A computer processes audio or video information as a series of numbers representing that information. The larger the range of possible values for the numbers, the higher the quality of the information. On the other hand, the larger the range of values, the higher the bitrate cost for the information. Table 1 shows ranges of values for several types of audio or video information of different quality levels, along with corresponding bitrate costs.

TABLE 1

Ranges of values and cost per value for different quality audio or video information

| Information type and quality | Range of values | Cost |
|---|---|---|
| audio sequence, voice quality | 0–255 per sample | 8 bits (1 byte) |
| audio sequence, CD quality | 0–65,535 per sample | 16 bits (2 bytes) |
| video image, black and white | 0–1 per pixel | 1 bit |
| video image, gray scale | 0–255 per pixel | 8 bits (1 byte) |
| video image, "true" color | 0–16,777,215 per pixel | 24 bits (3 bytes) |

Aside from the range of values, the quantity of samples or pixels also affects the quality of the representation. A video frame with 320×240 pixels looks crisper than a lower resolution, 160×120 video frame. Video at 30 frames per second looks smoother than video at 7.5 frames per second. Again, however, the tradeoff for high quality is the cost of storing and transmitting the information. A 1 second video sequence with true color pixels, 320×240 frames, and 30 frames per second consumes 6,912,000 bytes—a bitrate of 55,296,000 bits per second. In comparison, a 1 second video sequence with gray scale pixels, 160×120 frames, and 7.5 frames per second consumes 144,000 bytes—a bitrate of 1,152,000 bits per second.

Audio and video information have high bitrate, and storing and transmitting the information is costly. Compression decreases the cost of storing and transmitting the information. Two categories of compression are lossless compression and lossy compression.

Lossless compression reduces the bitrate of information by removing redundancy from the information. For example, a series of ten identical pixels can be represented as the color of the pixels and the number ten. Lossless compression techniques reduce bitrate at no cost to quality, but can only reduce bitrate up to a certain point.

In contrast, lossy compression techniques reduce bitrate by any amount, but quality suffers and the lost quality cannot be restored. To maximize perceptual quality, lossy compression techniques seek to preserve perceptually important information while removing information less important to perceptual quality. Thus, an audio encoder removes portions of an audio signal that would not be heard by a human listener, or a video encoder blurs a video frame in a way that would not be noticeable to a human viewer. Conventional lossy compression techniques for video include quantization and frame dropping. In general, quantization changes the range of values used to represent pixels, while frame dropping eliminates frames or reduces frame rate.

Filtering is a technique commonly used to remove or suppress "salt and pepper" static or other noise in information. Filtering can also be used in video compression. For more information, see U.S. Pat. No. 5,787,203 to Lee et al., "Method and System for Filtering Compressed Video Images," issued Jul. 28, 1998, and Roosmalen et al., "Noise Reduction of Image Sequences as Preprocessing for MPEG2 Encoding," Proceedings of Eusipco (1998).

Median filtering is one type of filtering. Applied to a video frame, median filtering replaces each pixel in the video frame with the median of the neighboring values in a kernel around the pixel. Other terms for the kernel include window, neighborhood, mask, filter, filter operator, or filter shape. In FIG. 1, a 4×4 block (110) of gray scale pixels is median filtered with a five-value cross-shaped kernel (120), producing a 4×4 block (130) of filtered output. The kernel (120) is shown filtering the upper, leftmost pixel [195] of the block (110), and two values in the neighborhood of the pixel but outside of the block (110) are not considered. The values in the kernel (120) are sorted [16, 16, 195] and the middle value [16] is taken as the value of the pixel in the block (130) of filtered output. If the neighborhood contains an even number of values, the average of the two middle values can be taken. There are other conventions for handling edge values (e.g., replicating edge values to fill a kernel) and other shapes and sizes for the kernel (120).

Within a sequence of audio or video information, periods with rapid change (such as high motion video) or high detail have less redundancy to exploit than relatively constant, uniform periods. As a result, the information naturally compresses to a variable bitrate sequence.

In contrast, digital phone lines, videoconferencing connections, and many other transmission media offer constant bitrate for delivery of information. Although bandwidth fluctuates on the Internet, audio or video information sent over the Internet is typically compressed to a relatively constant bitrate that targets the average available bitrate for a connection.

To deliver video information at a relatively constant bitrate, conventional video encoders use bitrate adaptive quantization or bitrate adaptive frame dropping. Bitrate adaptive quantization and frame dropping cause a direct and immediate change in bitrate for a video frame. With bitrate adaptive quantization, quantization is increased so as to decrease bitrate, or quantization is decreased so as to increase bitrate. With bitrate adaptive frame dropping, video frames are dropped to immediately decrease bitrate.

While conventional bitrate adaptive compression techniques control bitrate, the quality of the compressed information dramatically and noticeably changes when an adjustment occurs. Frame dropping causes a "stutter" effect, and increasing quantization often causes visible blocking or ringing artifacts. Thus, the perceptual quality of the compressed information is not as good as it could be for the bitrate.

SUMMARY OF THE INVENTION

The present invention is directed to dynamic filtering of information during lossy compression. Dynamic filtering helps control bitrate or quality with few sudden, dramatic changes to the perceptual quality of the compressed information.

For example, a video encoder regulates the level of a buffer (e.g., how full or empty the buffer is) by adjusting median filtering of video information. The buffer stores compressed video information for the video encoder. Based upon the buffer level, the video encoder changes the median filter kernel applied to video information. If the buffer starts to get too full, the video encoder increases the size of the kernel, which tends to smooth the video information, introduce slight blurriness, and deplete the buffer. If the buffer starts to get too empty, the video encoder decreases the size of the kernel or stops filtering, which tends to preserve the video information and fill the buffer. Bitrate adaptive median filtering helps control bitrate of compressed video information without the noticeable stuttering caused by frame dropping or the visible blocking artifacts caused by adaptive quantization.

Additional features and advantages of the invention will be made apparent from the following detailed description of an illustrative embodiment that proceeds with reference to the accompanying drawings.

BRIEF DESCRIPTION OF THE DRAWINGS

FIG. 1 is a diagram showing median filtering of a 4×4 block of pixels with a cross-shaped kernel according to the prior art.

FIG. 2 is a block diagram of a suitable computing environment in which the illustrative embodiment may be implemented.

FIG. 4 is a flowchart showing a technique for bitrate adaptive median filtering of video information according to the illustrative embodiment.

FIG. 5 is a diagram showing buffer levels and corresponding median filter kernels according to the illustrative embodiment.

DETAILED DESCRIPTION OF AN ILLUSTRATIVE EMBODIMENT

Figure 3:
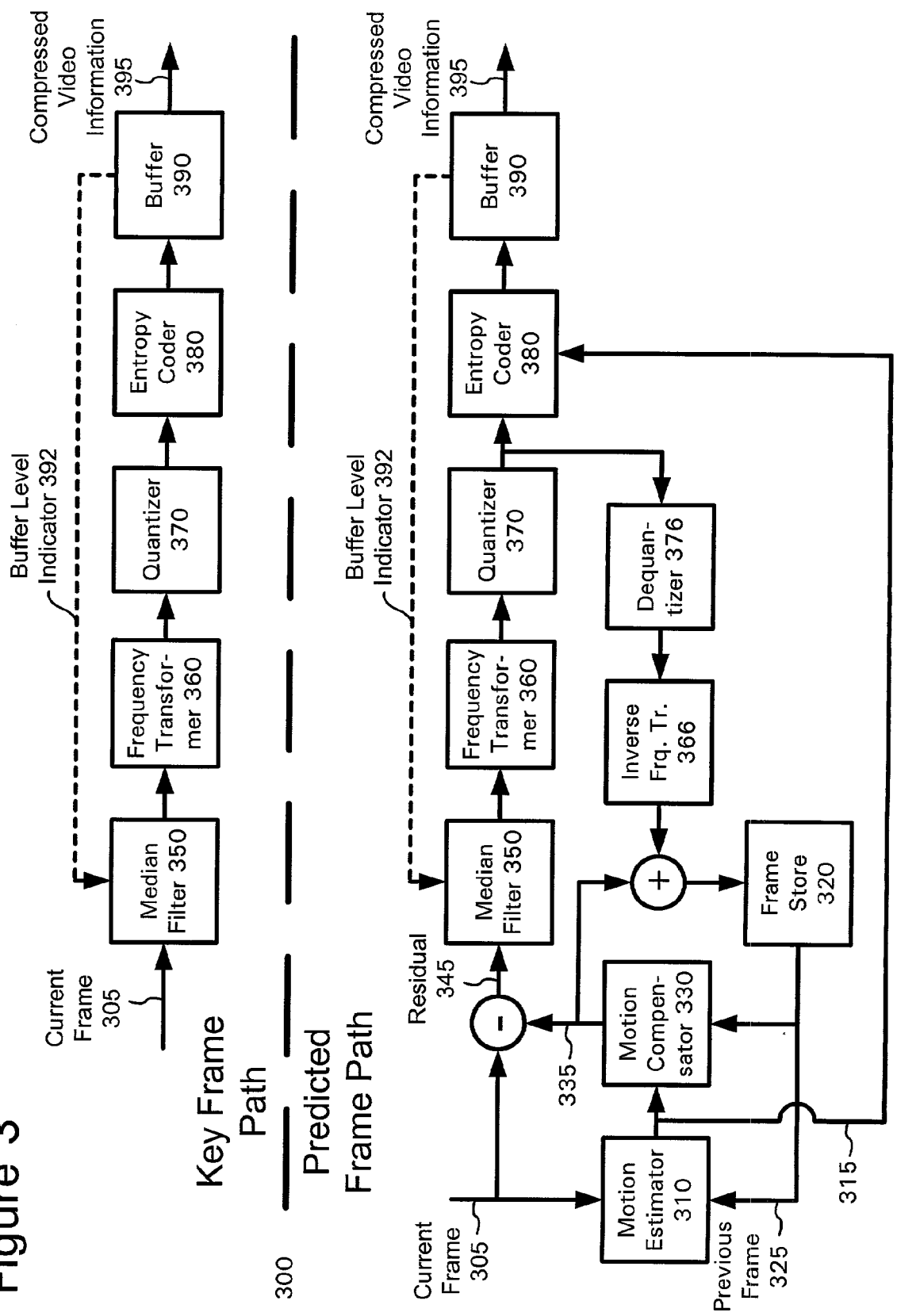
FIG. 3 is a block diagram of a video encoder system including a bitrate adaptive median filter according to the illustrative embodiment.

The illustrative embodiment of the present invention is directed to bitrate adaptive median filtering of video information (including pixel data and/or prediction residuals) by a video encoder. Median filtering tends to smooth video information while at the same time preserving useful detail in the video information. The smoothing adds redundancy, which makes subsequent compression more efficient. To control how much the video information is filtered, the video encoder changes the median filter kernel applied to the video information based upon the level of a buffer in the encoder. Bitrate adaptive median filtering, when used instead of or in addition to bitrate adaptive quantization and frame dropping, helps control bitrate with fewer dramatic and noticeable changes to the perceptual quality of the compressed information.

In the illustrative embodiment, the video encoder adaptively selects between no filtering, filtering with a three-value L-shaped kernel, filtering with a five-value cross-shaped kernel, or filtering with a 3×3 square kernel. If the buffer starts to become too full, the encoder increases the size of the kernel, which tends to smooth the video information (introducing slight blurriness) and deplete the buffer.

If the buffer starts to become too empty, the video encoder decreases the size of the kernel (or uses no median filtering at all), which tends to preserve the video information and fill the buffer. In alternative embodiments, instead of changing the filter kernel, an encoder changes the number of times the information is filtered with the same filter kernel. Increasing the number of times the information is filtered tends to smooth the information and decrease bitrate.

The illustrative embodiment is directed to median filtering of spatial domain video information. In alternative embodiments, information other than spatial domain video information is filtered (e.g., audio information) or kernel-based filtering other than median filtering (e.g., mean filtering, morphological filtering, other spatial and/or temporal linear or non-linear filtering) is applied.

The illustrative embodiment is directed to dynamic filtering based upon level of a buffer storing compressed video information. In alternative embodiments, adjustment is based on other types of bitrate indicators.

While the illustrative embodiment is directed to a frame-based video encoder, alternative embodiments are directed to object-based video encoders. In an object-based encoder, a video sequence includes one or more video objects. For each video object, regular or arbitrarily-shaped video object planes represent an instance of the video object in time. The video object planes are treated as frames for dynamic filtering for lossy compression, motion estimation/compensation, frequency transformation, quantization, and other operations within the encoder.

The illustrative embodiment is directed to adaptive filtering to control bitrate of compressed information. In alternative embodiments, filtering is dynamically changed to adjust quality. For example, filtering is dynamically changed to maintain constant quality of the compressed video information, as indicated by a perceptual quality measure or a numerical quality measure such as mean square error or mean absolute difference compared to the original video information. Or, filtering is dynamically changed to reallocate quality level/bitrate between different media types, with constant total bitrate output. Or, filtering is dyanamically changed for different video objects or video object planes (e.g., foreground vs. background) in a video sequence in order to give different quality levels to the different video objects or video object planes.

I. Computing Environment

FIG. 2 illustrates a generalized example of a suitable computing environment (200) in which the illustrative embodiment may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing bitrate adaptive median filtering for a video encoder system.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) implementing the bitrate adaptive median filtering.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form. The output device(s) (260) may be a display, printer, speaker, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "select," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Video Encoder System Including Bitrate Adaptive Median Filter

FIG. 3 is a block diagram of a video encoder system (300) including a bitrate adaptive median filter (350). The encoder system (300) receives a sequence of video frames including a current frame (305), and produces compressed video information (395) as output.

The bitrate adaptive median filter (350) processes video information (e.g., pixel data and/or prediction residuals) so that subsequent compression yields compressed video information (395) at a relatively constant bitrate and the buffer (390) stays within a safe range of fullness. The bitrate adaptive median filter (350) removes information that is relatively unimportant to perceptual quality. Thus, the perceptual quality of the compressed video information (395) is significantly better than video information compressed using only bitrate adaptive quantization and frame dropping.

The encoder system (300) compresses predicted frames and key frames. For the sake of presentation, FIG. 3 shows a path for key frames through the encoder system (300) and a path for forward-predicted frames. Many of the components of the encoder system (300) are used for compressing both key frames and predicted frames, though the exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame or intra-coded frame] is compressed without reference to other frames.

If the current frame (305) is a forward-predicted frame, a motion estimator (310) estimates motion of blocks or other regions of the current frame (305) with respect to the reconstructed previous frame (325), which is buffered in the frame store (320). The motion estimator (310) outputs motion information (315) such as motion vectors. A motion compensator (330) applies the motion information (315) to the reconstructed previous frame (325) to form a motion-compensated current frame (335). The prediction is rarely perfect, however, and the difference between the motion-compensated current frame (335) and the original current frame (305) is the prediction residual (345). Alternatively, a motion estimator and motion compensator apply another type of motion estimation/compensation.

For a predicted frame, the bitrate adaptive median filter (350) filters the prediction residual (345). For a key frame, the bitrate adaptive median filter (350) filters pixel data of the current frame (305). Because predicted frames are common in video sequences and prediction residuals include certain information with little perceptual significance, bitrate adaptive median filtering is effective for bitrate control.

The bitrate adaptive median filter (350) receives a buffer level indicator (392). The indicator (392) can be a number of bits used or unused in the buffer (390), a percentage of the buffer (390) that is full or empty, a numerical or percentage deviation from a target level, a pre-defined signal, or any other message indicating how full/empty the buffer (390) is or how the bit-ate adaptive median filter (350) must react to maintain a target level. The bitrate adaptive median filter (350) receives the buffer level indicator (392) on a frame-by-frame basis. Alternatively, the bitrate adaptive median filter (350) can receive the buffer level indicator (392) at a different frequency (e.g., every nth frame, group of blocks, macroblock, or other set of video information, or only as needed to change bitrate).

Based upon the indicator (392), the bitrate adaptive median filter (350) selects a median filter kernel. When the buffer (390) becomes too full, the bitrate adaptive median filter (350) selects a kernel that removes detail from the video information, tending to decrease bitrate but make the video slightly blurrier. When the buffer (390) is not full enough, the bitrate adaptive median filter (350) skips median filtering or selects a kernel that preserves more detail from the video information, which tends to increase bitrate.

The bitrate adaptive median filter (350) applies the same filtering rules to video information from key frames and predicted frames. Alternatively, a bitrate adaptive median filter uses different types of filtering on video information from key frames and predicted frames, or filters pixel data for all frames of a video sequence before motion estimation. If an encoder system does not use motion estimation/compensation, a bitrate adaptive median filter can work solely with pixel data for intra-coded frames.

After the bitrate adaptive median filter (350), a frequency transformer (360) converts the filtered spatial domain video information into frequency domain (i.e., spectral) data. For block-based video frames, the frequency transformer (360) applies a discrete cosine transform ["DCT"] to blocks of the pixel data or prediction residual data, producing blocks of DCT coefficients. Alternatively, the frequency transformer (360) applies another conventional frequency transform such as a wavelet transform, Fourier transform, or subband coding.

A quantizer (370) then quantizes the blocks of spectral data coefficients. Certain frequency ranges of spectral data (e.g., low frequency ranges) are more significant to a human viewer than other frequency ranges (e.g., high frequency ranges). Thus, the quantizer (370) applies non-uniform quantization to the blocks of spectral data coefficients, coarsely quantizing the high frequency spectral data coefficients. Alternatively, the quantizer applies another type of quantization to the spectral data coefficients, or directly quantizes spatial domain data in an encoder system that does not use frequency transformations.

Although the bitrate adaptive median filter (350) already adapts to regulate bitrate, the quantizer (370) can also adapt, if necessary, by changing the quantization step size. If bitrate adaptive median filtering and bitrate adaptive quantization fail to adequately regulate bitrate, the encoder system (300) can drop one or more frames of video information.

When a reconstructed current frame is needed for subsequent motion estimation/compensation, a dequantizer (376) performs inverse quantization on the quantized spectral data coefficients. An inverse frequency transformer (366) then performs the inverse of the operations of the frequency transformer (360), producing a reconstructed prediction residual (for a predicted frame) or a reconstructed key frame. If the current frame (305) was a key frame, the reconstructed key frame is taken as the reconstructed current frame (not shown). If the current frame (305) was a predicted frame, the reconstructed prediction residual is added to the motion-compensated current frame (335) to form the reconstructed current frame. The frame store (320) buffers the reconstructed current frame for use in predicting the next frame.

The entropy coder (380) compresses the motion information (315) and the output of the quantizer (370). Typical entropy coding techniques include arithmetic coding, Huffman coding, run length coding, LZ coding, dictionary coding, and combinations of the above.

The entropy coder (380) puts compressed video information (395) in the buffer (390). The buffer level indicator (392) is fed back to the bitrate adaptive median filter (350) for median filtering of the next frame. Alternatively, the buffer level indicator (392) is fed back to the bitrate adaptive median filter (350) as part of an inner loop for bitrate control, and the bitrate adaptive median filter (350) if necessary selects a new median filter kernel for the video information for the current frame (305).

The compressed video information (395) is depleted from the buffer (390) at a relatively constant bitrate and stored for subsequent streaming at that bitrate. Therefore, the level of the buffer (390) is primarily a function of the entropy of the filtered, quantized video information, which affects the efficiency of the entropy coding. Alternatively, the encoder system (300) streams compressed video information immediately following compression, and the level of the buffer (390) also depends on the rate at which information is depleted from the buffer (390) for transmission.

Before or after the buffer (390), the compressed video information (395) can be channel coded for transmission over the network. The channel coding can apply error protection and correction data to the compressed video information (395).

A decoder system (not shown) receives compressed video information (395) output by the encoder system (300) and produces a reconstructed video sequence. In the decoder system, a buffer receives compressed video information (395). An entropy decoder decompresses the compressed video information (395) in an entropy decoding operation, producing blocks of quantized spectral data coefficients and motion information. A motion compensator reconstructs predicted frames using the motion information. A dequantizer dequantizes the quantized spectral data coefficients in an inverse quantization operation. An inverse frequency transformer performs the inverse of the operations; of the frequency transformer (360).

III. Bitrate Adaptive Median Filtering

FIG. 4 is a flowchart showing a technique (400) for bitrate adaptive median filtering of video information (e.g., pixel data and/or prediction residuals) for frames of a video sequence according to the illustrative embodiment. An encoder system such as the one shown in FIG. 3 performs the median filtering technique (400), selecting median filter kernels for corresponding buffer levels as shown in FIG. 5.

The buffer (500) is not part of a system actually streaming compressed video information over a network. Instead, the buffer (500) helps adaptively compress the video information to a certain bitrate for later streaming over a network. In the illustrative embodiment, buffer size depends upon expected transmission rate and expected end-to-end delay due to the network and client-side buffering. The buffer (500) stores 500 Kbits of compressed video information, based upon an expected transmission rate of 100 Kbits per second and an expected end-to-end delay of 5 seconds. Given the size of the buffer (500), adjustment on a frame-by-frame basis allows the encoder to react in a timely manner to changes in buffer level. For a buffer of a different size, the frequency of adjustment can change, and vice versa.

With reference to FIGS. 4 and 5, the encoder starts (410) with video information for a first video frame. The encoder measures (420) the level of the buffer (500), which is a function of the amount of space available in the buffer (500) at the time of measurement.

The buffer (500) includes four buffer ranges (510, 520, 530, 540). If the buffer is completely empty, 500 Kbits is available for buffering. The first range (510) spans the levels of 100% empty up to and including 85% empty. The second range (520) spans the levels from 85% empty up to and including 60% empty. The third range (530) spans the levels from 60% empty up to and including 25% empty. The fourth range (540) spans the levels from 25% empty up to and including completely full. With the buffer (500), ranges (510, 520, 530, 540) and corresponding median filters shown in FIG. 5, the buffer level tends towards the second range (520), safely away from the extremes of the buffer (500).

The ranges and corresponding median filter kernels can vary depending on implementation. Moreover, instead of being set according to bits unused/percentage of the buffer (500) that is empty, ranges are alternatively set according to number of bits used, percentage of the buffer that is full, or a numerical or percentage deviation from a target level. A different set of median filter kernels can be used, potentially including other shapes (e.g., star-shape or line, two-dimensional or three dimensional shapes) and/or sizes of kernels.

Based upon an indicator of the measured buffer level of the buffer (500), the encoder selects (430) a median filter kernel. If the buffer level at the time of measurement is within the first range (510), the encoder selects not to median filter the video information of the frame. If the buffer level is within the second range (520), third range (530), or fourth range (540), the encoder selects the three-value L-shaped median filter kernel, the five-value cross-shaped median filter kernel, or the 3×3 median filter kernel, respectively.

The encoder then filters (440) the video information for the frame using the selected median filter kernel. The filtered video information is subsequently frequency transformed, quantized, entropy coded, and stored in the buffer (500), affecting subsequent measurements of buffer level.

The encoder determines (450) whether the video sequence includes any additional frames. If so, the encoder measures (420) the level of the buffer (500) for filtering the next frame. If not, the encoder ends (460) the bitrate adaptive median filtering.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system with a video encoder, a method for regulating level of a buffer for the video encoder, the method comprising:
   determining an indicator value associated with a level of a buffer for a video encoder; and
   based at least in part upon the indicator value, adjusting median filtering of video information, wherein the median filtering the video information includes median filtering a prediction residual, wherein a kernel defines a neighborhood of values for the median filtering, and wherein the adjusting comprises changing shape of the kernel based at least in part upon the indicator value; wherein the level of the buffer has plural range values, and wherein each of the plural range values is assigned a kernel shape such that the kernel is changed to the assigned shape when the level of the buffer is within the range value.

2. The method of claim 1 wherein the changing comprises:
   if the indicator value is within a first range, selecting a first kernel; and
   if the indicator value is within a second range, selecting a second kernel.

3. The method of claim 1 wherein the adjusting further comprises changing a number of times for the median filtering of the video information.

4. The method of claim 1 wherein the determining and the adjusting occur on a frame-by-frame basis.

5. The method of claim 1 wherein the median filtering the video information includes median filtering intra-coded pixel data.

6. A computer readable medium storing instructions for causing a computer programmed thereby to perform the method of claim 1.

7. The method of claim 1 wherein the indicator value is based at least in part on a quality measure.

8. The method of claim 7 wherein the quality measure is a perceptual quality measure.

9. The method of claim 1 wherein the median filtering includes:
   sorting n input values, wherein n is an odd number greater than 2; and
   selecting an output value that is the middle value of the sorted input values.

10. The method of claim 1 wherein the median filtering includes:
    sorting n input values, wherein n is an even number greater than 1; and
    determining an output value as the unweighted average of the two middle values of the sorted input values.

11. The method of claim 1 wherein the determining an indicator value associated with a level of a buffer comprises determining the indicator value based at least in part upon one or more of percentage of the buffer that is full, numerical deviation from a target level associated with level of the buffer, percentage deviation from a target level of the buffer, percentage of the buffer that is empty, and number of bits used by the buffer.

12. The method of claim 1 wherein the changing shape of the kernel based at least in part upon the indicator value comprises changing shape to one of an L-shaped kernel, a cross-shaped kernel, or a square kernel.

13. The method of claim 12 wherein the kernel is the square kernel when the indicator value indicates that the buffer is full, and is changed successively to the cross-shaped kernel, the L-shaped kernel and no kernel as the indicator value decreases.

14. The method of claim 1 wherein the kernel shapes are chosen from a group consisting of: an L-shaped kernel and a star kernel.

15. The method of claim 1 wherein the changing shape of the kernel based at least in part upon the indicator value comprises changing shape to an L-shaped kernel.

16. In a video encoder, a bitrate adaptive median filter for video information, the bitrate adaptive median filter comprising:
    means for selecting a kernel for median filtering video information, the kernel defining a neighborhood of values for the median filtering, the selecting based upon bitrate of previously compressed video information, wherein the selecting includes changing shape of the kernel to one of an L-shaped kernel, a cross-shaped kernel, or a square kernel; and means for applying the selected kernel to the video information for the median filtering, wherein the means for applying produces filtered video information, and wherein the applying the selected kernel to the video information includes applying the selected kernel to a prediction residual.

17. The bitrate adaptive median filter of claim 16 wherein the filter controls bitrate in conjunction with means for adaptively quantizing the filtered video information and means for adaptively dropping compressed video information for one or more frames.

18. The bitrate adaptive median filter of claim 16 further comprising:

means for buffering the previously compressed video information, wherein the bitrate of the previously compressed video information affects fullness of the means for buffering.

19. A computer readable medium storing instructions for causing a computer programmed thereby to perform a method of regulating lossy compression of video information in a video encoder, the method comprising:

during lossy compression of a set of video information, intermittently changing a kernel for filtering the set of video information, wherein the kernel defines a neighborhood of values for the filtering, the kernel selected from plural available kernels including at least a first kernel with a first kernel shape and a second kernel with a second kernel shape different than the first kernel shape, the first kernel for decreasing quality and bitrate, and the second kernel for preserving quality and increasing bitrate, and wherein the first kernel shape is chosen from a group consisting of an L-shaped kernel, a star kernel, a cross-shaped kernel, or a square kernel; and using the kernel to filter the set of video information, including filtering a prediction residual.

20. The computer readable medium of claim 19 wherein each of the plural available kernels is a median filter kernel.

21. The computer readable medium of claim 19 wherein the changing is based at least in part upon a quality constraint for the set of video information.

22. The computer readable medium of claim 19 wherein the changing is based at least in part upon a bitrate constraint for the set of video information.

23. The computer readable medium of claim 19 wherein the set of video information includes video information for a video object.

24. A computer readable medium storing instructions for causing a computer programmed thereby to perform a method of controlling bitrate of information in an encoder, the method comprising:

receiving a bitrate indicator for filtering a set of information, the received bitrate indicator indicating a bitrate goal for the set of information, the bitrate indicator based at least in part upon level of a buffer; and based at least in part upon the received bitrate indicator, adjusting kernel-based filtering of the set of information, wherein a kernel defines a neighborhood of values for the kernel-based filtering, wherein the filtering of the set of information includes filtering a prediction residual, and wherein the adjusting comprises changing shape of the kernel based at least in part upon the received bitrate indicator, wherein the changing shape of the kernel comprises changing shape to one of an L-shaped kernel, a cross-shaped kernel, or a square kernel.

25. The computer readable medium of claim 24 wherein the filtering is median filtering.

26. The computer readable medium of claim 24 wherein the adjusting flirt her comprises changing a number of times for the filtering of the information.

27. The computer readable medium of claim 24 wherein the set of information is for a video sequence, and wherein the receiving and the adjusting occur for each new set of information for the video sequence.

28. In a computer system, an encoder comprising:

a bitrate adaptive filter for filtering information, wherein a kernel defines a neighborhood of values for the bitrate adaptive filter, wherein the bitrate adaptive filter adjusts filtering by changing shape of the kernel, and wherein the filtering the information includes filtering intra-coded pixel data and prediction residuals;

a frequency transformer for transforming filtered information into the frequency domain;

a quantizer for quantizing frequency transformed information;

an entropy coder for entropy coding quantized information; and a buffer for buffering entropy coded information, wherein the bitrate adaptive filter adjusts filtering in relation to level of the buffer; wherein the level of the buffer has plural range values, and wherein each of the plural range values is assigned a kernel shape such that the kernel is changed to the assigned shape when the level of the buffer is within the range value.

29. The encoder of claim 24 wherein the bitrate adaptive filter is a bitrate adaptive median filter.

30. The encoder of claim 28 wherein the quantizer is a bitrate adaptive quantizer.

31. The encoder of claim 30 wherein the information is for plural frames of a video sequence, and wherein the encoder drops information for one or more of the plural frames when the buffer approaches fullness.

* * * * *